US012083581B2

(12) United States Patent
Brunet

(10) Patent No.: US 12,083,581 B2
(45) Date of Patent: Sep. 10, 2024

(54) FASTENING COLLAR INSTALLATION APPARATUS AND METHODS OF INSTALLING A FASTENER SYSTEM

(71) Applicant: Howmet Aerospace Inc., Pittsburgh, PA (US)

(72) Inventor: Arnaud Brunet, Eure (FR)

(73) Assignee: HOWMET AEROSPACE INC., Pittsburgh, PA (US)

( * ) Notice: Subject to any disclaimer, the term of this patent is extended or adjusted under 35 U.S.C. 154(b) by 289 days.

(21) Appl. No.: 17/633,713

(22) PCT Filed: Nov. 22, 2019

(86) PCT No.: PCT/IB2019/001376
§ 371 (c)(1),
(2) Date: Feb. 8, 2022

(87) PCT Pub. No.: WO2021/099814
PCT Pub. Date: May 27, 2021

(65) Prior Publication Data
US 2022/0314302 A1     Oct. 6, 2022

(51) Int. Cl.
*B21J 5/02*      (2006.01)
*B21J 15/02*     (2006.01)
(Continued)

(52) U.S. Cl.
CPC ............. *B21J 15/022* (2013.01); *B21J 15/32* (2013.01)

(58) Field of Classification Search
CPC . B21J 15/022; B21J 15/35; B21J 15/30; B21J 15/045; B21J 15/43; B21J 15/10; F16B 19/05; Y10T 29/49956
See application file for complete search history.

(56) References Cited

U.S. PATENT DOCUMENTS 2,978,946 A * 4/1961 Looker .................. B21J 15/022
411/361
3,024,331 A    3/1962 Frink
(Continued)

FOREIGN PATENT DOCUMENTS

| JP | 2011-017443 A | 1/2011 |
| KR | 10-2017-0067157 A | 6/2017 |
| WO | 86/06448 A1 | 11/1986 |

OTHER PUBLICATIONS

Extended European Search Report for European Application No. 19953606.1 mailed Oct. 10, 2022.
(Continued)

*Primary Examiner* — Mohammed S. Alawadi
(74) *Attorney, Agent, or Firm* — K&L Gates LLP

(57) ABSTRACT

Fastening collar installation apparatus and methods of installing a fastener system are provided. The fastening collar installation apparatus comprises an anvil, a sleeve, and a lever. The sleeve comprises a first section comprising a first sleeve end and a second sleeve end, a sleeve cavity, and a slot. The first sleeve end is intermediate the anvil and the second sleeve end. The slot extends a first distance from the first sleeve end. The lever is slidably received by the slot of the sleeve and configured to move between a first lever position in the slot and a second lever position in the slot. The lever comprises a second distance from a first lever end to a second lever end. The second distance is less than the first distance.

20 Claims, 8 Drawing Sheets

(51) Int. Cl.
*B21J 15/30* (2006.01)
*B21J 15/32* (2006.01)
*F16B 19/05* (2006.01)

(56) References Cited

U.S. PATENT DOCUMENTS

| | | | |
|---|---|---|---|
| 3,204,331 A * | 9/1965 | Looker | F16B 19/05 29/520 |
| 3,204,517 A | 9/1965 | Looker | |
| 4,347,728 A * | 9/1982 | Smith | B21J 15/022 29/243.529 |
| 4,598,572 A * | 7/1986 | Mondello | B21J 15/022 403/109.5 |
| 5,049,016 A | 9/1991 | Nordyke | |
| 2008/0184545 A1 | 8/2008 | Cobzaru et al. | |

OTHER PUBLICATIONS

International Search Report and Written Opinion of the International Searching Authority for International Application No. PCT/IB2019/001376 mailed Aug. 14, 2020.

* cited by examiner

FASTENING COLLAR INSTALLATION APPARATUS AND METHODS OF INSTALLING A FASTENER SYSTEM

FIELD OF USE

The present disclosure relates to fastening collar installation apparatus and methods of installing a fastener system.

BACKGROUND

Vehicle frames, storage racks, solar panel sub-structures, aircraft parts, and other structures can include numerous mechanical fasteners. For example, a fastener (e.g., a bolt, a structural fastener) can be installed in a bore of a structural component and secured by a fastening collar, such as, for example, a bolt collar and/or a nut. Installing a fastening collar securely can present challenges.

SUMMARY

In one aspect, a fastening collar installation apparatus is provided. The fastening collar installation apparatus comprises an anvil, a sleeve, and a lever. The anvil comprises a first anvil end and a second anvil end. An anvil cavity extends into the anvil along a first axis from the first anvil end. The anvil cavity is configured to receive at least a portion of a mandrel. The sleeve comprises a first section comprising a first sleeve end and a second sleeve end. The first sleeve end is intermediate the anvil and the second sleeve end. A sleeve cavity extends from the first sleeve end along a second axis. A slot extends a first distance from the first sleeve end. The lever is slidably received by the slot of the sleeve and configured to move between a first lever position in the slot and a second lever position in the slot. The lever comprises a first lever end and a second lever end. The first lever end is intermediate the second lever end and the anvil. A second distance is defined from the first lever end to the second lever end. The second distance is less than the first distance. In the first lever position of the lever, the first axis and the second axis are substantially aligned. In the second lever position of the lever, the first axis and second axis are not substantially aligned.

In another aspect, a fastener installation kit comprising a fastening collar installation apparatus and a fastener configured to be installed by the fastening collar installation apparatus is provided. The fastening collar installation apparatus comprises an anvil, a sleeve, and a lever. The anvil comprises a first anvil end and a second anvil end. An anvil cavity extends into the anvil along a first axis from the first anvil end. The anvil cavity is configured to receive at least a portion of a mandrel. The sleeve comprises a first section comprising a first sleeve end and a second sleeve end. The first sleeve end is intermediate the anvil and the second sleeve end. A sleeve cavity extends from the first sleeve end along a second axis. A slot extends a first distance from the first sleeve end. The lever is slidably received by the slot of the sleeve and configured to move between a first lever position in the slot and a second lever position in the slot. The lever comprises a first lever end and a second lever end. The first lever end is intermediate the second lever end and the anvil. A second distance is defined from the first lever end to the second lever end. The second distance is less than the first distance. In the first lever position of the lever, the first axis and the second axis are substantially aligned. In the second lever position of the lever, the first axis and second axis are not substantially aligned.

In yet another aspect, a method for installing a fastener system comprising a fastening collar and a mandrel is provided. The method comprises positioning a first anvil end of an anvil of a fastening collar installation apparatus in contact with the fastening collar. The fastening collar installation apparatus comprises an anvil, a sleeve, and a lever. The anvil comprises the first anvil end and a second anvil end. An anvil cavity extends into the anvil along a first axis from the first anvil end. The anvil cavity is configured to receive at least a portion of the mandrel. The sleeve comprises a first section comprising a first sleeve end and a second sleeve end. The first sleeve end is intermediate the anvil and the second sleeve end. A sleeve cavity extends from the first sleeve end along a second axis. A slot extends a first distance from the first sleeve end. The lever is slidably received by the slot of the sleeve and configured to move between a first lever position in the slot and a second lever position in the slot. The lever comprises a first lever end and a second lever end. The first lever end is intermediate the second lever end and the anvil. A second distance is defined from the first lever end to the second lever end. The second distance is less than the first distance. In the first lever position of the lever, the first axis and the second axis are substantially aligned. In the second lever position of the lever, the first axis and second axis are not substantially aligned. Subsequent to the positioning, the first anvil end of the anvil is forcibly contacted with the fastening collar while the lever is in the first lever position, thereby deforming the fastening collar onto the mandrel. The lever is moved to the second lever position, thereby misaligning the first and second axis and bending the mandrel.

It will be understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1:
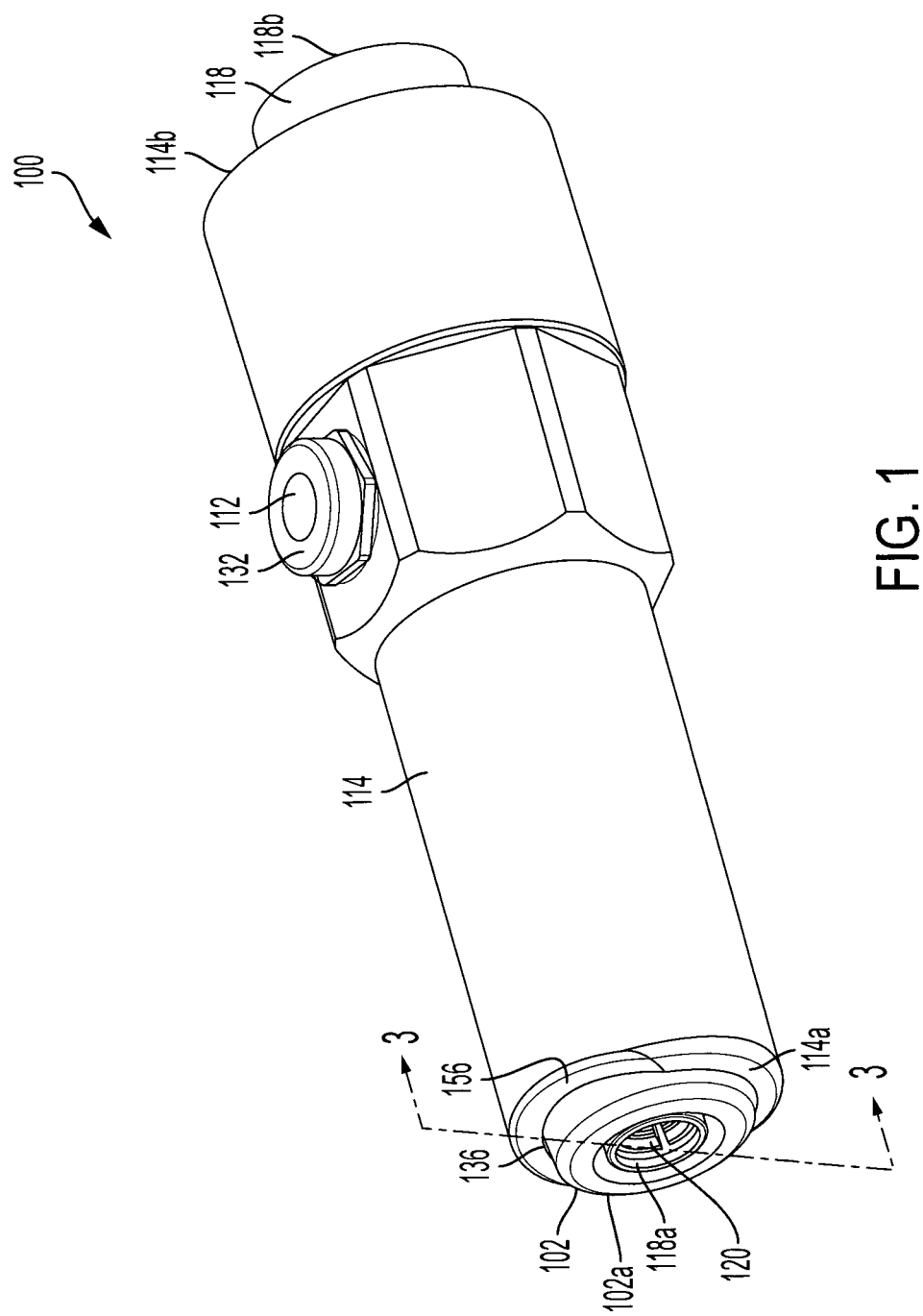
FIG. 1 is a perspective view of a non-limiting embodiment of a fastening collar installation apparatus according to the present disclosure.

Various examples are described and illustrated herein to provide an overall understanding of the structure, function, and use of the disclosed apparatus and methods. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of the present disclosure. As such, the claims may be amended to recite any features or characteristics expressly or inherently described in, or otherwise expressly or inherently supported by, the present disclosure. Further, Applicant reserves the right to amend the claims to affirmatively disclaim features or characteristics that may be present in the prior art. The various embodiments disclosed and described in the present disclosure can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In the present disclosure, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in the present disclosure is intended to include all higher numerical limitations subsumed therein. Accordingly, Applicant reserves the right to amend the present disclosure, including the claims, to expressly recite any sub-range subsumed within the ranges expressly recited. All such ranges are inherently described in the present disclosure.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Installing a fastening collar to a mandrel of a fastener system can be difficult, time consuming, and loud. For example, upon installation of a fastening collar, the mandrel may be intentionally broken in a tension mode in order to reduce the overall length of the fastener system after installation. Breaking the mandrel can result in a release of significant acoustic energy (e.g., a loud noise) which can be amplified by the structure into which the fastener system is being installed. The present inventors determined that breaking a mandrel in a manner that comprises bending the mandrel can reduce the release of acoustic energy. Therefore, embodiments of a fastening collar installation apparatus and methods of installing a fastener system according to the present disclosure may involve breaking a mandrel of the fastener system by a process comprising bending the mandrel. Additionally, the present disclosure provides non-limiting embodiments of an improved fastening collar installation apparatus and methods of installing a fastener system that may simplify the installation process and reduce installation time.

Figure 2:
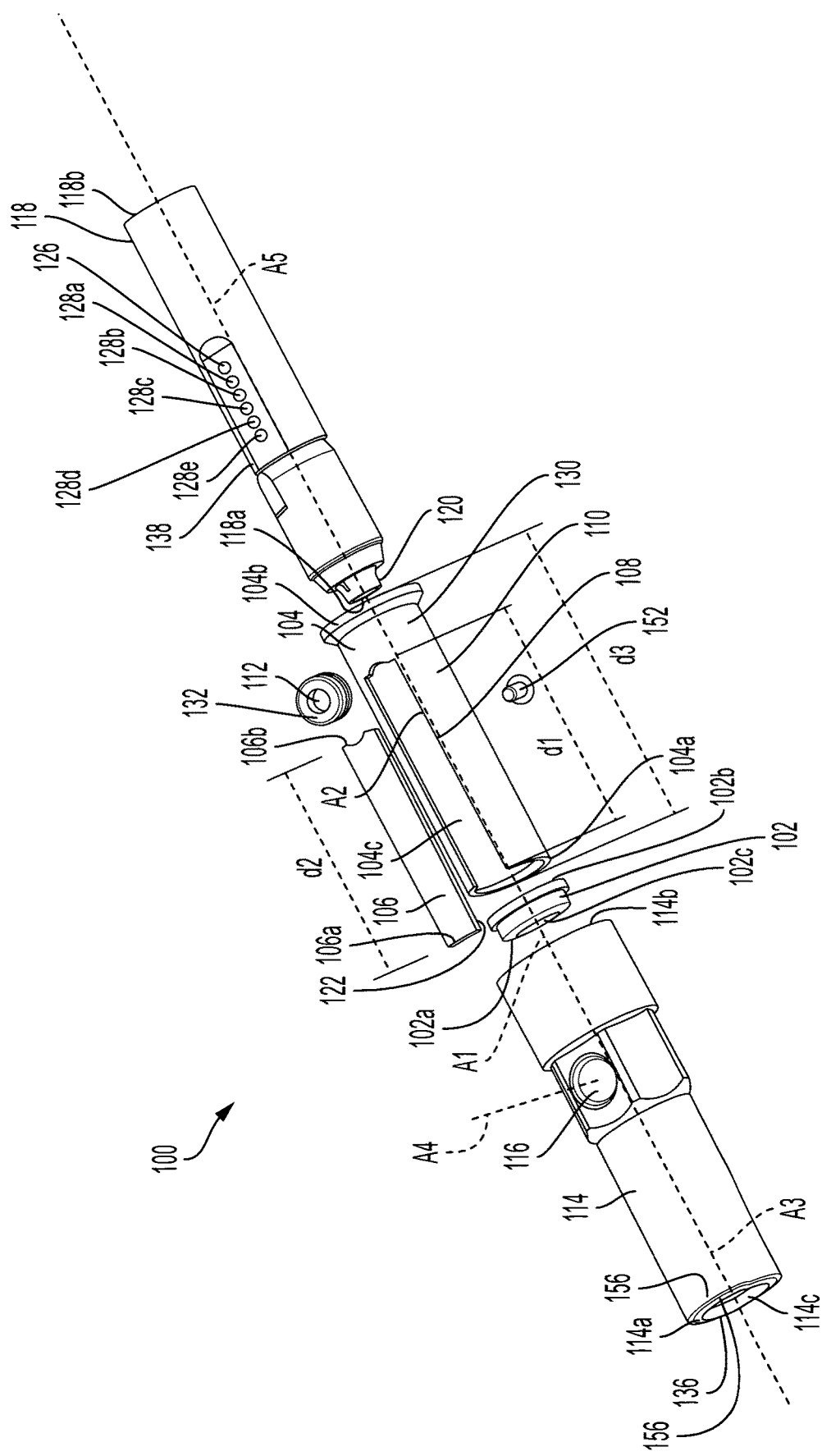
FIG. 2 is an exploded perspective view of the non-limiting embodiment of a fastening collar installation apparatus of FIG. 1.
Figure 3:
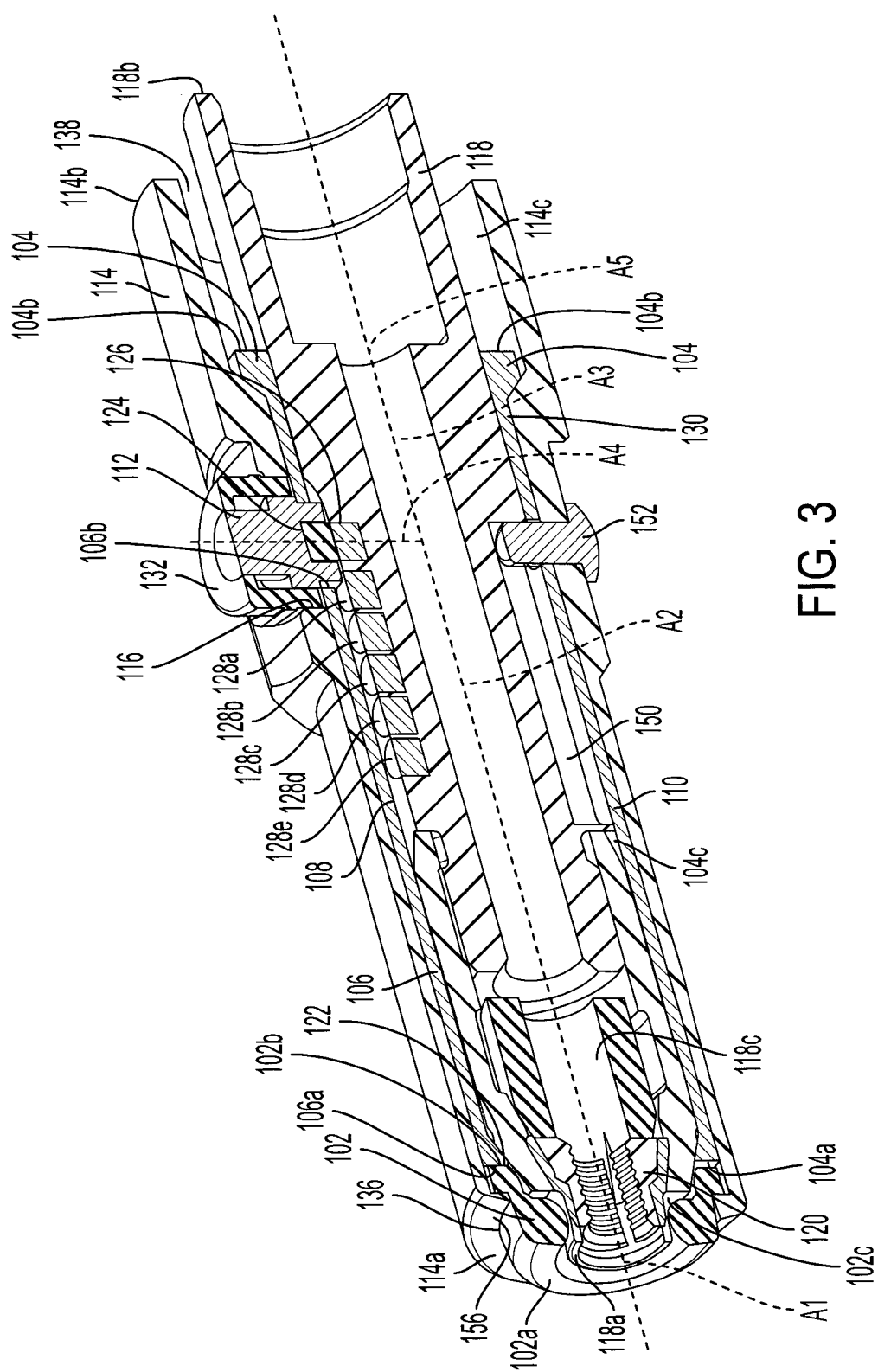
FIG. 3 is a cross-sectional perspective view of the non-limiting embodiment of a fastening collar installation apparatus of FIG. 1, taken along line 3-3 in FIG. 1.

FIGS. 1-3 illustrate a non-limiting embodiment of fastening collar installation apparatus 100 according to the present disclosure. The fastening collar installation apparatus 100 can engage at least a portion of a fastener system (e.g., a pull section of a mandrel of the fastener system) and/or deform a portion of the fastener system (e.g., deform a fastening collar and/or break a mandrel of the fastener system). The fastening collar installation apparatus 100 can be configured with various components in order to engage the fastener system's mandrel, deform the fastening collar, and/or break the mandrel. For example, referring to FIGS. 2-3, the fastening collar installation apparatus 100 can comprise an anvil 102, a sleeve 104, a lever 106, a locker 112, a housing 114, and a collet 118.

The housing 114 can be configured to receive and/or retain various components. For example, the housing 114 can comprise a first housing end 114a comprising an opening 136, a second housing end 114b comprising an opening 138, and a housing cavity 114c extending along a longitudinal axis, $A_3$, of the housing 114 from the first housing end 114a to the second housing end 114b. The housing 114 can be substantially cylindrical. The housing cavity 114c can be configured to receive the anvil 102, the sleeve 104, the lever 106, the locker 112, and the collet 118.

The anvil 102 can be configured to engage and/or deform a fastening collar of a fastener system. For example, the anvil 102 can be configured to be received by the housing cavity 114c and positioned within the housing cavity 114c intermediate the first housing end 114a and the sleeve 104. In various embodiments, the anvil 102 can be adjacent to and in contact with the first housing end 114a and protruding through the first opening 136 such that the anvil 102 can engage and/or deform a fastening collar of a fastener system positioned proximal to the first housing end 114a of the housing 114. The opening 136 of the first housing end 114a can be sized such that the anvil 102 can be inhibited from extending beyond the first housing end 114a and retained within the housing cavity 114c by the first housing end 114a.

In various non-limiting embodiments, the first housing end 114a can have a variable thickness. For example, the first housing end 114a can have a clearance cut 158 which has a housing slope angle. The clearance cut 158 can minimize contact between a structure and the fastening collar installation apparatus 100 during installation of a fastener system such as shown and described in FIGS. 4A-4D below.

Referring again to FIGS. 2-3, the anvil 102 can comprise a first anvil end 102a, a second anvil end 102b, and an anvil cavity 102c extending into the anvil 102 along a longitudinal axis, $A_1$, from the first anvil end 102a. The anvil cavity 102c can be configured to receive at least a portion of a fastener system, such as, for example, a fastening collar and/or a mandrel of a fastener system. For example, in various embodiments, the anvil 102 can have a toroid shape.

The anvil 102 can be moveable with respect to the sleeve 104, housing 114, and/or collet 118, such that the anvil 102 can change orientation with respect to the sleeve 104, housing 114, and/or collet 118 as described with reference to FIGS. 4A-B. Referring again to FIGS. 2-3, the sleeve 104 and the lever 106 can be configured to control changes to the orientation of anvil 102, sized and configured to be received by the housing cavity 114c, and positioned within the housing cavity 114c intermediate the anvil 102 and the second housing end 114b. The sleeve 104 can comprise a section 110, a sleeve cavity 104c, and a slot 108. The section 110 can comprise a first sleeve end 104a and a second sleeve end 104b. In various non-limiting embodiments, the section 110 is substantially cylindrical.

The sleeve 104 can be oriented such that the first sleeve end 04a can be intermediate the anvil 102 and the second sleeve end 104b. The sleeve cavity 104c can extend from the first sleeve end 104a along a longitudinal axis, $A_2$, and through an opening in the first sleeve end 104a and an opening in the second sleeve end 104b. The slot 108 can extend a first distance, $d_1$, from the first sleeve end 104a. The first distance, $d_1$, can be less than a third distance, $d_3$, that is a distance the section 110 extends from the first sleeve end 104a to the second sleeve end 104b. For example, the slot 108 may not extend to the second sleeve end 104b of the sleeve 104 such that the sleeve 104 contains a continuous annular section 130 adjacent to the second sleeve end 104b.

When components of the fastening collar installation apparatus 100 are assembled as illustrated in FIG. 3, the lever 106 can be positioned within the housing cavity 114c of the housing 114 and slidably received by the slot 108 of the sleeve 104. The lever 106 can be configured to move relative to the sleeve 104 so that, for example, the lever 106 can move between a first lever position in the slot 108 and a second lever position in the slot 108, as described with reference to FIGS. 4A-D.

Referring again to FIGS. 2-3, the lever 106 can comprise a first lever end 106a and a second lever end 106b. The lever 106 can be oriented such that the first lever end 106a is intermediate the second lever end 106b and the anvil 102. The first lever end 106a can contact the anvil 102 and/or support a position of the anvil 102. A second distance, $d_2$, can be defined from the first lever end 106a to the second lever end 106b. The second distance, $d_2$, can be less than the first distance, $d_1$, such that the lever 106 is slidably moveable within the slot 108.

The first lever end 106a of the lever 106 can comprise a protrusion 122. The protrusion 122 can be configured to engage the collet 118 such that the collet 118 can apply a force to the lever 106 to move the lever 106. For example, the collet 118 can move the lever from the second lever position into the first lever position by forcibly contacting the protrusion 122.

The anvil 102 can be subject to an orientation change based on the movement of the lever 106. For example, when the lever 106 is in the first lever position, the anvil 102 may be in a first orientation with respect to the sleeve 104 such that the longitudinal axis, $A_1$, and the longitudinal axis, $A_2$, are substantially aligned, as illustrated in FIG. 3. When the lever 106 is in the second lever position, the anvil 102 may be in a second orientation with respect to the sleeve 104 such that the longitudinal axis, $A_1$, and the longitudinal axis, $A_2$, are not substantially aligned, as illustrated in FIG. 4D.

Referring again to FIGS. 2-3, the housing 114 can comprise an opening 116 extending along an axis, $A_4$, substantially perpendicular to the longitudinal axis, $A_3$. The opening 116 can be aligned with at least a portion of the slot 108 such that the locker 112 can be received by the opening 116 and moveable into and out of the slot 108. The movement of the locker 112 can control position changes of the lever 106. For example, the locker 112 can be configured to be received by the slot 108, and the locker 112 can be moveable between a first locker position and a second locker position in the slot 108, as illustrated in FIGS. 4A-D.

In the first locker position as illustrated in FIG. 3, the locker 112 can extend at least partially into the slot 108 to inhibit the lever 106 from moving into the second lever position. For example, in the first locker position, the locker 112 can forcibly contact the second lever end 106b of the lever 106 and urge the lever 106 towards the first lever position, which can maintain the anvil 102 in the first orientation. In the second locker position as illustrated in FIGS. 4C-4D, the locker can be positioned within the opening 116 and the locker 112 may not extend into the slot 108 and can allow the lever 106 to move into the second lever position, thereby allowing the anvil 102 to move to the second orientation.

The locker 112 can be configured, for example, as a pin and can be received by a locker housing 132 operatively coupled to the housing 114. The locker 112 can be moveable within the locker housing 132 in order to control changes in a position of the lever 106.

The collet 118 can be sized and configured such that the collet 118 engages and/or moves at least a portion of a fastener system, such as, for example, a pull section of a mandrel of a fastener system. The collet 118 can be positioned within the sleeve cavity 104c of the sleeve 104 and configured to move relative to the sleeve 104 and/or anvil 102 in order to draw a fastener system engaged with the collet 118 into contact with the anvil 102. For example, the collet 118 can be moveable between a first collet position and a second collet position in the sleeve cavity 104c, as described with reference to FIGS. 4A-4D.

The collet 118 can comprise a first collet end 118a adjacent to the anvil 102, a second collet end 118b, and a collet cavity 118c extending from the first collet end 118a. The first collet end 118a can comprise jaws 120 to engage at least a portion of a fastener, such as, for example, the pull section of a mandrel of a fastener system. For example, the jaws 120 can comprise a grooved section or a threaded section which matches a grooved section or threaded section on the pull section of the fastener system. In various embodiments, at least one of the jaws and the pull section of the mandrel of the fastener system comprises a substantially cylindrical section. In various embodiments, the jaws 120 are configured to retract within the sleeve 104 and move the pull section distal from a fastening collar of the fastener system.

The second collet end 118b can be configured to engage a tool that can generate a linear force, such as, for example, a piston of a powered installation tool. The powered installation tool can be a battery-powered tool, such as, for example, at least one of a Huck® Range Force™ battery-powered installation tool; a pneumatic tool, such as, for example, a Huck® 254 pneumatic tool; and a hydraulic tool, such as, for example, a Huck® SF hydraulic tool, all available from Arconic Fastening Systems, Waco, Texas The collet 118 can be moved independently of the anvil 102, the sleeve 104, the lever 106, and the housing 114.

The fastening collar installation apparatus 100 may comprise magnets to facilitate automated movement of the locker 112. For example, the locker 112 can comprise a first magnet 124 which can be embedded within the locker 112. In various embodiments, the locker 112 can comprise at least two first magnets (not shown). The collet 118 can comprise a second magnet 126 and a third magnet 128a. In various embodiments, the collet 118 can comprise at least two second magnets (not shown) and/or least two third magnets 128a-b, such as, for example, five third magnets 128a-e as illustrated in FIGS. 2-3. The second magnet 126 and the third magnets 128a-e can be positioned to magnetically interact with the first magnet 124.

With reference to the accompanying figures, the second magnet 126 and the third magnets 128a-e can move the locker 112 from the first locker position to the second locker position. For example, the second magnet 126 can be configured to attract the first magnet 124, and the third magnets 128a-e can be configured to repel the first magnet 124. If the force of magnetic attraction between the second magnet 126 and the first magnet 124 is stronger than the force of magnetic repulsion between the first magnet 124 and the third magnets 128a-e, the locker 112 can be urged to the first locker position by the second magnet 126. Alternatively, if the force of magnetic repulsion between the third magnets 128a-e and the first magnet 124 is stronger than the force of magnetic attraction between the first magnet 124 and the second magnet 126, then the locker 112 can be urged to the second locker position by the third magnets 128a-e.

The third magnets 128a-e can be intermediate the second magnet 126 and the first collet end 118a and can be positioned in a line such that movement of the collet 118 along the longitudinal axis, $A_3$, can change the force of magnetic attraction experience by the second magnet 126. For example, movement of the collet 118 can change the position of the second magnet 126 and the third magnets 128a-e relative to the first magnet 124, thereby changing the force of magnetic attraction/repulsion between the magnets 124, 126, and 128a-e. Thus, movement of the collet 118 can move the locker 112, which can control the position of the lever 106 and, thereby, control the orientation of the anvil 102.

In various embodiments, the collet 118 can comprise a groove 150, and the fastening collar installation apparatus 100 can comprise a pin 152 which can be configured to be received by the groove 150. The groove 150 and pin 152 can be configured to control a rotation of the collet 118 about longitudinal axis, $A_3$, and/or inhibit the collet 118 from traversing along the longitudinal axis, $A_3$, beyond a predetermined distance.

In various non-limiting embodiments, a fastener kit is provided comprising the fastener collar installation apparatus 100 and a fastener system configured to be installed by the fastening collar installation apparatus.

Referring to FIGS. 4A-4D, the fastening collar installation apparatus 100 can engage a pull section 446 of a mandrel 444 of a fastener system 440, deform a fastening collar 442 of the fastener system 440, and/or break the mandrel 444, thereby installing the fastener system 440. For example, the fastener system 440 can be installed in a structure. In various embodiments, the structure can be configured as at least one of an aerospace component or structure, an automotive component or structure, a transportation component or structure, a building and construction component or structure, or another component or structure.

Figure 4A:
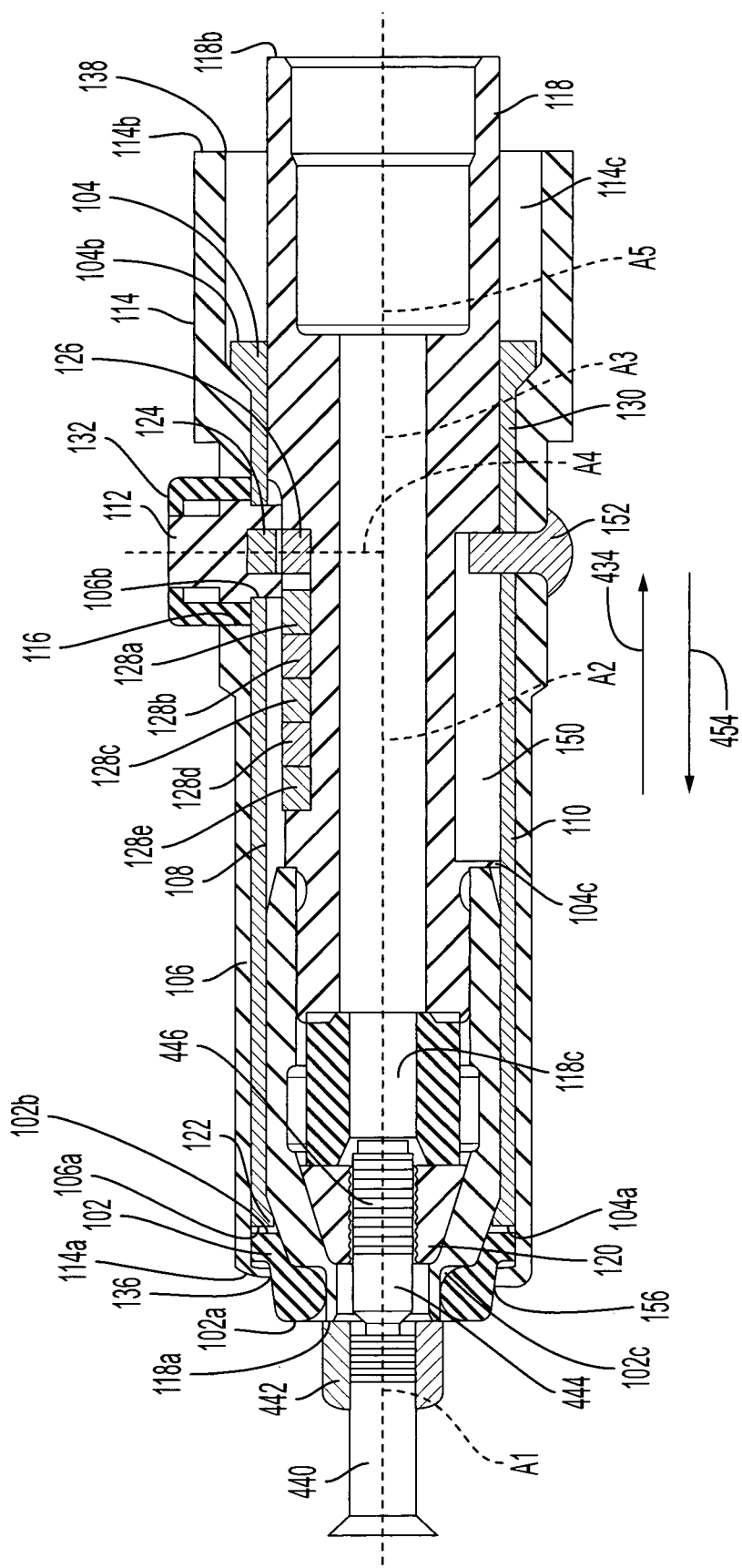
FIG. 4A is a cross-sectional side view of a non-limiting embodiment of a fastening collar installation apparatus engaged with a fastener system according to the present disclosure.
Figure 4B:
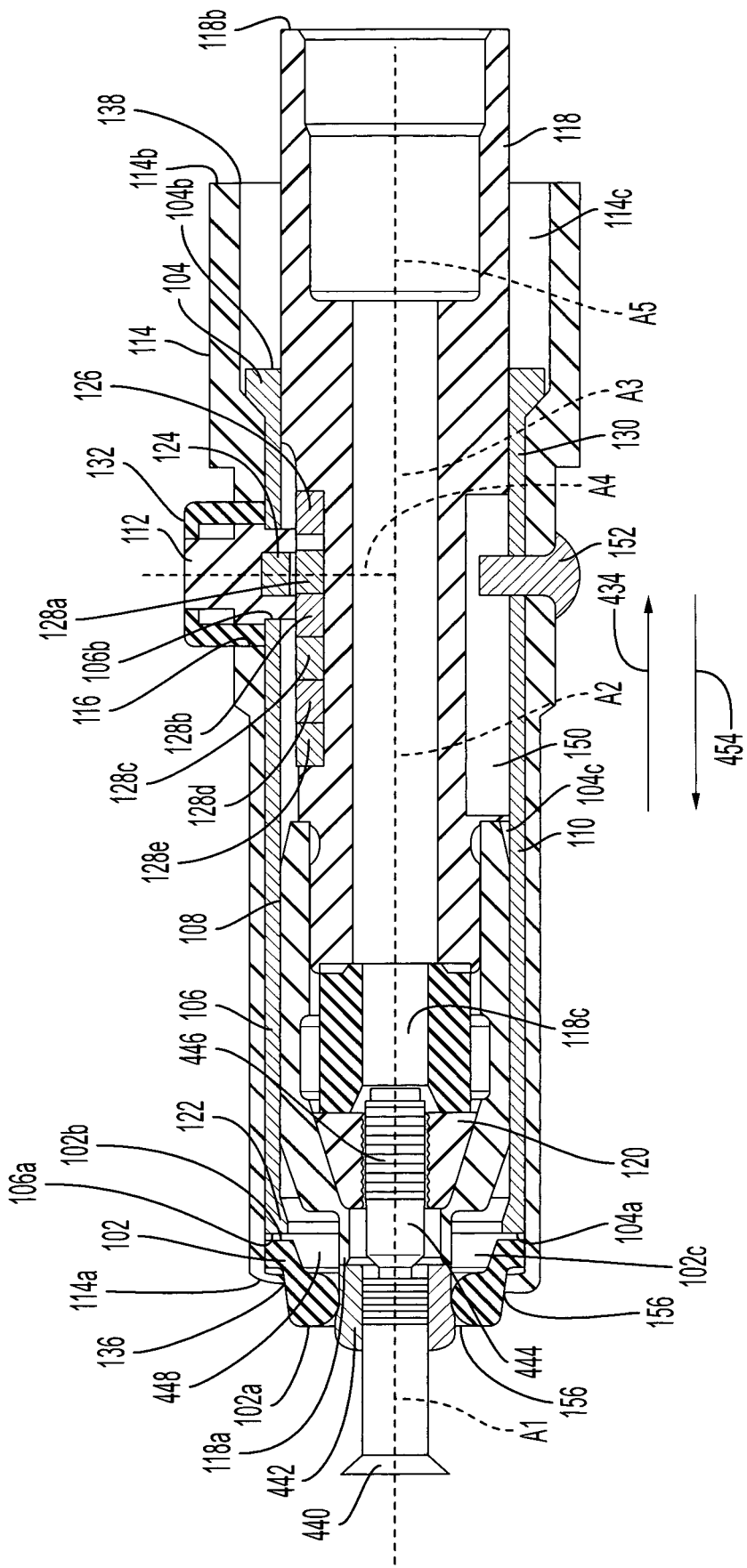
FIG. 4B is a cross-sectional side view of the non-limiting embodiment of a fastening collar installation apparatus of FIG. 4A with a linear force being applied to a collet of the fastening collar installation apparatus according to the present disclosure.
Figure 4C:
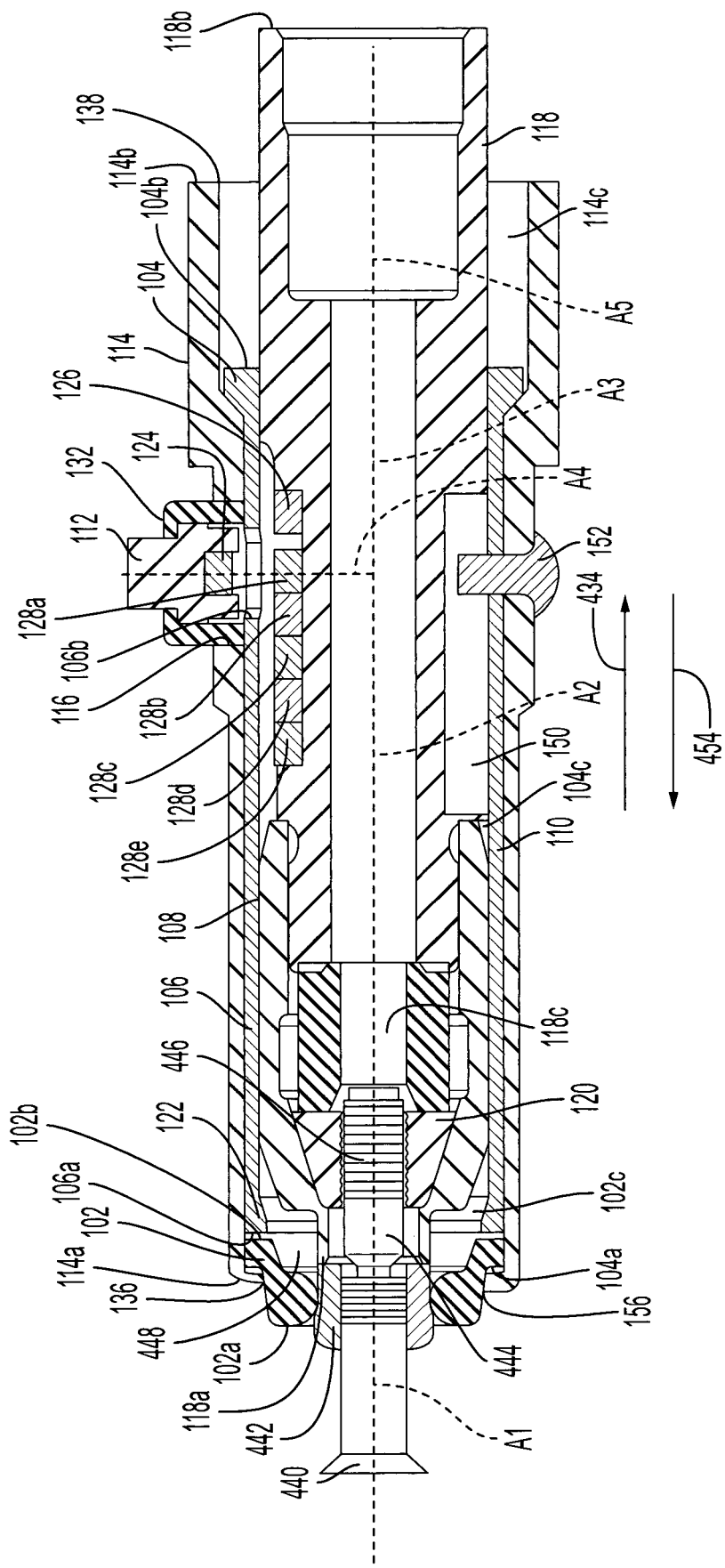
FIG. 4C is a cross-sectional side view of the non-limiting embodiment of a fastening collar installation apparatus of FIG. 4B after releasing the linear force on the collet according to the present disclosure.
Figure 4D:
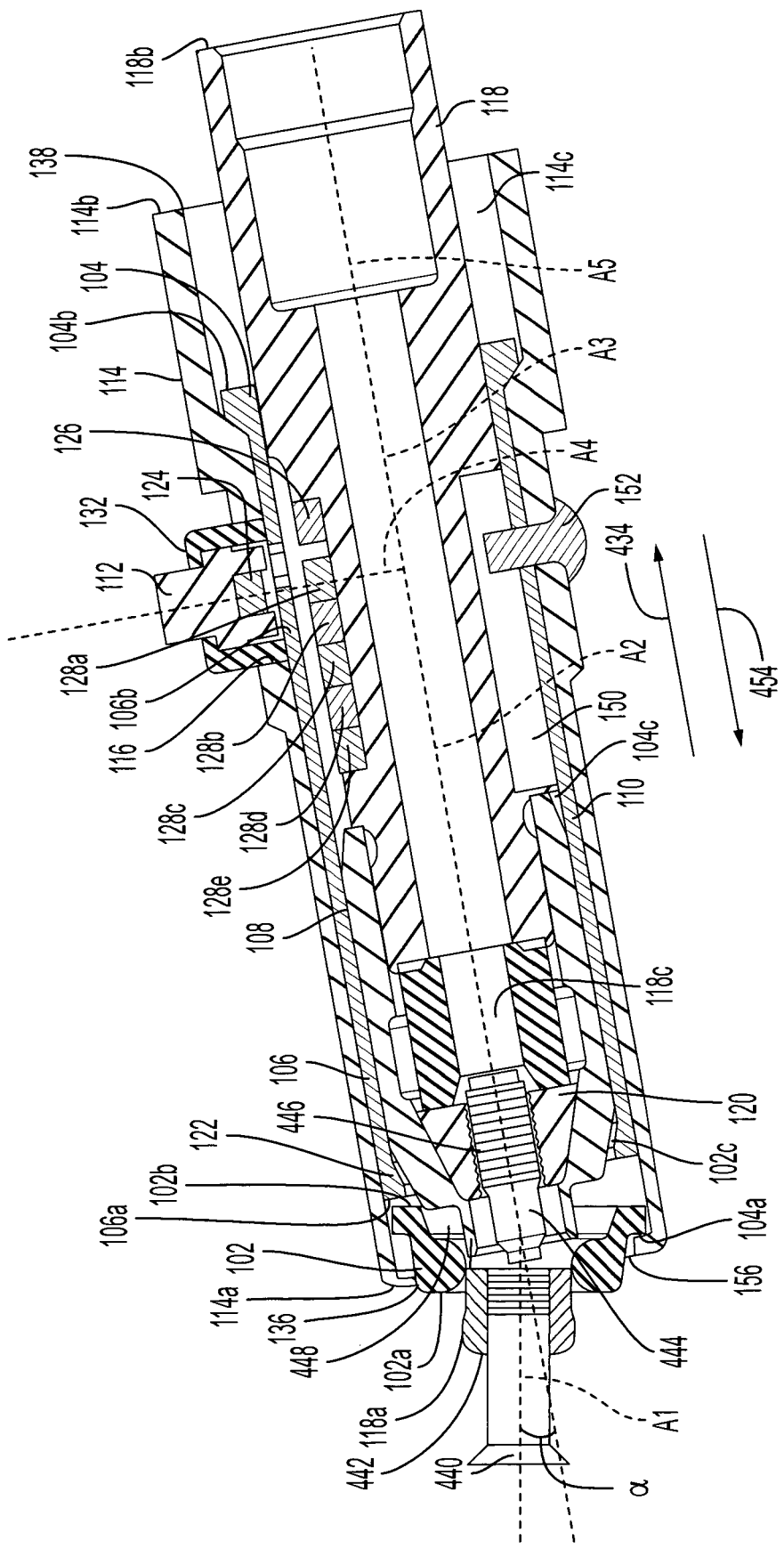
FIG. 4D is a cross-sectional side view of the non-limiting embodiment of a fastening collar installation apparatus of FIG. 4C after re-applying the linear force to the collet according to the present disclosure.

Referring to FIG. 4A, the jaws 120 of the collet 118 are engaged with the pull section 446 of the mandrel 444 of the fastener system 440. The second magnet 126 is positioned relative to the first magnet 124 such that the second magnet 126 is more strongly magnetically attracted to the first magnet 124 than the first magnet 124 is repulsed by the third magnets 128a-e. For example, the second magnet 126 is adjacent to the first magnet 124. Therefore, the locker 112 is urged into the first locker position by the second magnet 126, as illustrated in FIG. 4A, and the longitudinal axis, $A_1$, of the anvil 102 and the longitudinal axis, $A_2$, of the sleeve 104 are substantially aligned. The collet 118 is in a first collet position and the lever 106 is in a first lever position. Additionally, the mandrel 444 is a single continuous piece.

The collet 118 can be moved by a tool which can generate a linear force. In FIG. 4B, the collet 118 has been moved from the first collet position, illustrated in FIG. 4A, to a second collet position, illustrated in FIG. 4B, by applying a linear force to the collet 118 in direction 434. The linear force applied to the collet 118 urges the fastener system 440 in the direction 434. Therefore, the fastener system 440 urges the anvil 102 in the direction 434 and, as a result, the anvil 102 urges the lever 106 in the direction 434. However, since the locker 112 is in the first locker position, the lever 106 is inhibited from moving to the second lever position. Thus, the anvil 102 deforms the fastening collar 442, and the fastening collar 442 traverses at least partially into the anvil cavity 102c. Additionally, moving the collet 118 to the second collet position increases a distance between the anvil 102 and the collet 118 and forms a gap 448, thereby urging the fastening collar 442 to contact the anvil 102.

In the second collet position, the third magnets 128a-e are positioned relative to the first magnet 124 such that the first magnet 124 is more strongly repelled by third magnets 128a-e than the first magnet 124 is attracted to the second magnet 126. For example, the third magnet 128a is adjacent to the first magnet 124. Therefore, the locker 112 is urged into the second locker position by the third magnets 128a-e. However, with reference to FIG. 4B, linear force applied to the collet 118 is still maintained due to the arrangement of the anvil 102 and the lever 106. Thus, the lever 106 forcibly contacts the locker 112 and inhibits the locker 112 from moving to the second locker position.

However, referring to FIG. 4C, when the linear force is no longer applied to the collet 118, the forcible contact between the lever 106 and the locker 112 is overcome by the force of magnetic repulsion between the third magnets 128a-e and the first magnet 124. Therefore, the locker 112 moves to the second locker position and the lever 106 is enabled to move to the second lever positon.

After releasing the linear force for a period of time, linear force is re-applied to the collet 118 in the direction 434, as illustrated in FIG. 4D, and the collet 118 has moved the fastener system 440. The fastener system 440 has contacted the anvil 102 and since the locker 112 is in the second locker position, the lever 106 will have been urged to the second lever position in the slot 108 by the anvil 102, which changes an orientation of the anvil 102 with respect to the sleeve 104, collet 118, and housing 114. Therefore, the longitudinal axis, $A_1$, of the anvil 102 and the longitudinal axis, $A_2$, of the sleeve 104 are no longer substantially aligned. For example, the axes $A_1$ and $A_2$ can be misaligned by an angle, a, that is at least 5 degrees, at least 6 degrees, at least 7 degrees, at least 8 degrees, or at least 9 degrees. In various non-limiting embodiments, axes $A_1$ and $A_2$ can be misaligned by an angle, $\alpha$, that is no greater than 10 degrees, no greater than 9 degrees, no greater than 8 degrees, no greater than 7 degrees, or no greater than 6 degrees. In certain embodiments, the axes $A_1$ and $A_2$ can be misaligned by an angle, $\alpha$, that is in a range of 5 to 10 degrees, such as, for example, 6 to 9 degrees, or 6 to 8 degrees. In various embodiments, the axes $A_1$ and $A_2$ can be misaligned by an angle, $\alpha$, of 7 degrees. In various non-limiting embodiments, the housing slope angle can be the same as the angle, $\alpha$.

Due to the misalignment of axes $A_1$ and $A_2$, the anvil 102 and the collet 118 impart a breaking force to the mandrel 444 which causes the mandrel 444 to separate into at least two pieces. The breaking of the mandrel 444 can reduce the overall length and weight of the fastener system 440 and can release less acoustic energy than prior methods. Additionally, the automated movement of the locker 112 can increase installation efficiency.

After the mandrel 444 has been broken, a linear force can be applied to the collet 118 in the direction 454, thereby urging the collet 118 to traverse along the longitudinal axis, $A_3$. The collet 118 contacts the protrusion 122 of the lever 106, thereby urging the lever 106 into the first lever position and the anvil 102 into the first orientation. Accordingly, the fastening collar installation apparatus 100 can automatically reset to install another fastener system.

The fastening collar installation apparatus 100 can include a material comprising at least one of a metal, a metal alloy, and a composite material. In various embodiments, the material is at least one of aluminum, an aluminum alloy, titanium, a titanium alloy, nickel, a nickel alloy, iron, and an iron alloy. In various embodiments, the material comprises a composite material such as, for example, a carbon fiber composite material. The fastening collar installation apparatus 100 can be manufactured by various processes, such as, for example, at least one of machining, casting, molding, and additive manufacturing.

Figure 5:
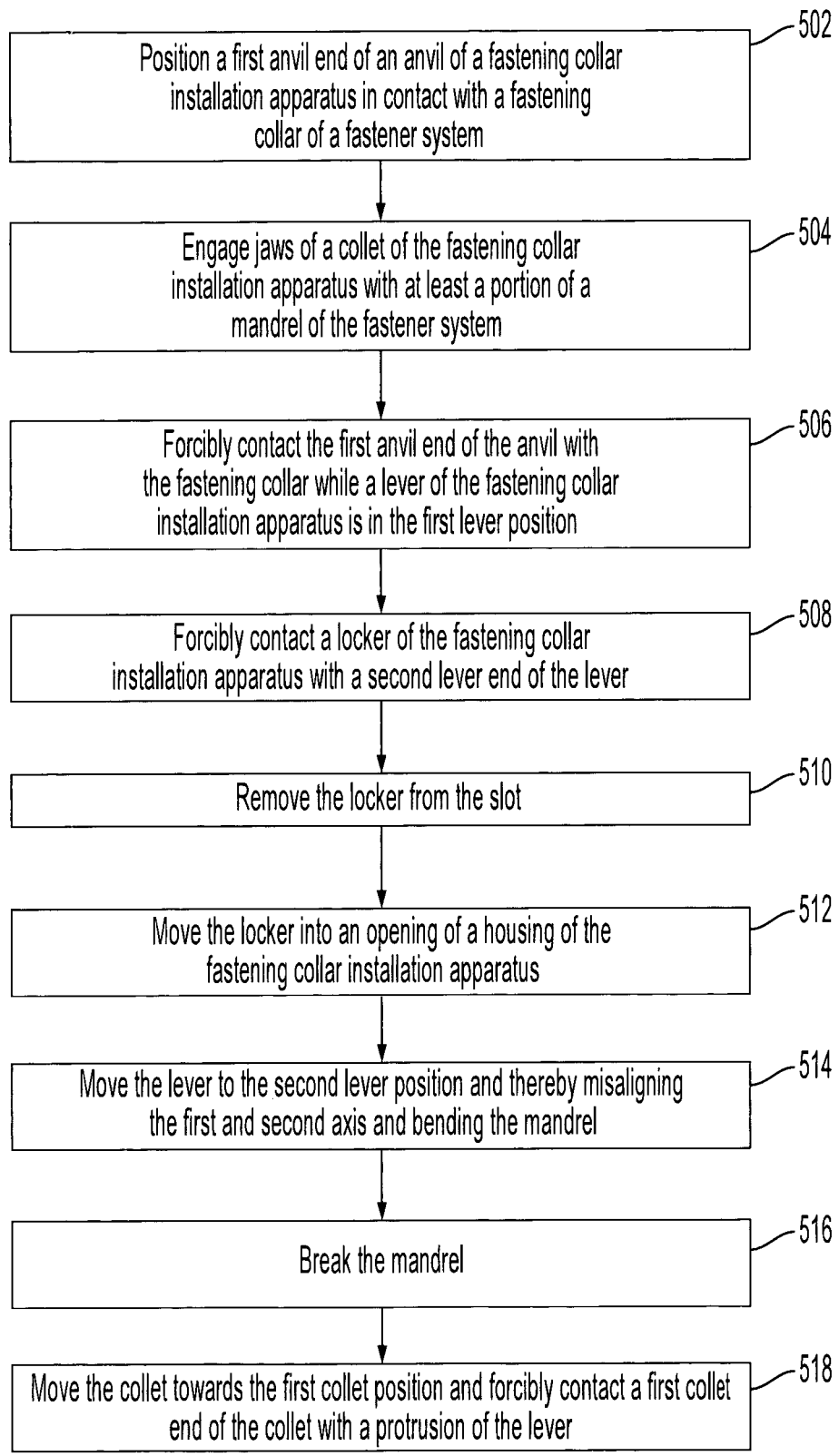
FIG. 5 is a flow chart illustrating a non-limiting embodiment of a method for installing a fastener system according to the present disclosure.

FIG. 5 is a flow chart illustrating a non-limiting method for installing a fastener system according to the present disclosure. The method comprises positioning a first anvil end of an anvil of a fastening collar installation apparatus according to the present disclosure in contact with a fastening collar of the fastener system, 502. In various embodiments, jaws of the collet of the fastening collar installation apparatus can be engaged with at least a portion of a mandrel of the fastener system, 504.

Subsequent to the positioning, the first anvil end of the anvil may be forcibly contacted with the fastening collar of the fastener system while a lever of the fastening collar installation apparatus is in a first lever position, thereby deforming the fastening collar onto the mandrel of the fastener system, 506. In various embodiments comprising engaging the jaws of the collet with at least a portion of the mandrel, subsequent to the engaging, the collet can be moved to a second collet position such that a distance between the anvil and the collet increases, thereby urging the fastening collar to contact the anvil. During the forcible contact of the first anvil end of the anvil with the fastening collar, a locker positioned within a slot of a sleeve of the fastening collar installation apparatus can be forcibly contacted with the second lever end of the lever to inhibit the locker from being moved out of the first locker position, 508. In various embodiments, the locker can be urged into the slot with a second magnet of the collet prior to forcibly contacting the first anvil end of the anvil with the fastening collar.

The locker can be removed from the slot to enable the lever to move to the second lever position, 510. For example, removing the locker from the slot can comprise moving the locker from the slot into an opening of the housing, 512. In various embodiments, the collet can be moved into the second collet position and the locker can be urged out of the slot with a third magnet of the collet. In certain embodiments, if used, the forcible contact between the locker and the second lever end of the lever can be substantially removed to enable the locker to be removed from the slot by the third magnet.

The lever can be moved to the second lever position, thereby misaligning the first and second axis and bending the mandrel, 514. For example, the collet can forcibly contact the fastener system with the anvil, thereby moving the anvil into the second orientation. In various embodiments, bending the fastener comprises breaking the mandrel, 516.

Subsequent to the bending, the lever can be urged into the first lever position by moving the collet towards the first collet position and forcibly contacting the first collet end of the collet with a protrusion of the lever, 518. Accordingly, the fastening collar installation apparatus can be configured so that it is ready to install another fastener system.

Various aspects of the invention include, but are not limited to, the aspects listed in the following numbered clauses.

1. A fastening collar installation apparatus comprising:
   an anvil comprising
      a first anvil end; and
      a second anvil end,
      wherein an anvil cavity extends into the anvil along a first axis from the first anvil end, the anvil cavity configured to receive at least a portion of a mandrel;
   a sleeve comprising
      a first section comprising a first sleeve end and a second sleeve end, the first sleeve end is intermediate the anvil and the second sleeve end,
      wherein a sleeve cavity extends from the first sleeve end along a second axis and a slot extends a first distance from the first sleeve end; and a lever slidably received by the slot of the sleeve and configured to move between a first lever position in the slot and a second lever position in the slot, the lever comprising
  a first lever end; and
  a second lever end, wherein the first lever end is intermediate the second lever end and the anvil,
  wherein a second distance is defined from the first lever end to the second lever end, and wherein the second distance is less than the first distance;
wherein, in the first lever position of the lever, the first axis and the second axis are substantially aligned; and
wherein, in the second lever position, of the lever the first axis and the second axis are not substantially aligned.

2. The fastening collar installation apparatus of clause 1, wherein in the second lever position of the lever, the first axis and the second axis are misaligned by at least 5 degrees.

3. The fastening collar installation apparatus of any one of clauses 1-2, wherein, in the second lever position of the lever, the first axis and the second axis are misaligned at an angle in a range of 5 degrees to 10 degrees.

4. The fastening collar installation apparatus of any one of clause 1-3, further comprising:
  a locker configured to be received by the slot,
  wherein the locker is moveable between a first locker position and a second locker position,
  wherein, in the first locker position, the locker extends at least partially into the slot to inhibit the lever from moving into the second lever position, and
  wherein in the second locker position the locker does not extend into the slot and allows the lever to move into the second lever position.

5. The fastening collar installation apparatus of clause 4, further comprising:
  a housing comprising:
    a first housing end, and
    a second housing end,
    wherein a housing cavity extends along a third axis from the first housing end to the second housing end,
    wherein the anvil, the sleeve, and the lever are positioned within the housing cavity,
    wherein the anvil is positioned intermediate the first housing end and the sleeve,
    wherein an opening extends along a fourth axis substantially perpendicular to the third axis,
    wherein the opening is aligned with at least a portion of the slot, and
    wherein, in the second locker position, the locker is positioned within the opening.

6. The fastening collar installation apparatus of any one of clauses 1-5, further comprising:
  a collet positioned within the sleeve cavity, the collet comprising:
    a collet end adjacent to the anvil, the collet end comprising jaws to engage at least a portion of a mandrel,
    wherein the collet is moveable between a first collet position and a second collet position in the sleeve cavity.

7. The fastening collar installation apparatus of clause 6, wherein the first lever end of the lever comprises a protrusion, and wherein, in the first collet position, the collet urges the lever into the first lever position by contacting the protrusion.

8. The fastening collar installation apparatus of any one of clauses 6-7, further comprising:
  a locker configured to be received by the slot and comprising a first magnet,
  wherein the locker is moveable between a first locker position and a second locker position,
  wherein, in the first locker position, the locker inhibits the lever from moving into the second lever position,
  wherein, in the second locker position, the lever allows the lever to move into the second lever position,
  wherein the collet comprises a second magnet and a third magnet intermediate the second magnet and the collet end, and
  wherein the second magnet is configured to attract the first magnet and the third magnet is configured to repel the first magnet.

9. A fastening installation kit comprising:
  the fastening collar installation apparatus of claim one of clauses 1-8; and
  a fastener system configured to be installed by the fastening collar installation apparatus.

10. The kit of clause 9, wherein in the second lever position of the lever the first axis and the second axis are misaligned by at least 5 degrees.

11. The kit of any one of clauses 9-10, wherein in the second lever position of the lever, the first axis and the second axis are misaligned by an angle in a range of 5 degrees to 10 degrees.

12. The kit of any one of clauses 9-11, wherein the first lever end of the lever comprises a protrusion, and wherein in the first collet position the collet urges the lever into the first lever position by contacting the protrusion.

13. The kit of any one of clauses 9-12, wherein fastening collar installation apparatus comprises a locker and a collet, wherein the locker comprises a first magnet and the collet comprises a second magnet and a third magnet intermediate the second magnet and a collet end of the collet, wherein the second magnet is configured to attract the first magnet and the third magnet is configured to repel the first magnet.

14. A method for installing a fastener system comprising a fastening collar and a mandrel, the method comprising:
  positioning a first anvil end of an anvil of a fastening collar installation apparatus in contact with the fastening collar, the fastening collar installation apparatus comprising:
    an anvil comprising:
      the first anvil end;
      a second anvil end,
      wherein an anvil cavity extends into the anvil along a first axis from the first anvil end, the anvil cavity configured to receive at least a portion of the mandrel; a sleeve comprising
        a first section comprising a first sleeve end and a second sleeve end, the first sleeve end is intermediate the anvil and the second sleeve end,
        wherein a sleeve cavity extends from the first sleeve end along a second axis, and
        wherein a slot extends a first distance from the first sleeve end; and
    a lever slidably received by the slot of the sleeve and configured to move between a first lever position in the slot and a second lever position in the slot, the lever comprising
      a first lever end; and
      a second lever end, wherein the first lever end is intermediate the second lever end and the anvil,
      wherein a second distance is defined from the first lever end to the second lever end, and
      wherein the second distance is less than the first distance;

wherein, in the first lever position of the lever, the first axis and the second axis are substantially aligned, and wherein, in the second lever position of the lever, the first axis and second axis are not substantially aligned;

subsequent to the positioning, forcibly contacting the first anvil end of the anvil with the fastening collar while the lever is in the first lever position, thereby deforming the fastening collar onto the mandrel;

moving the lever to the second lever position, thereby misaligning the first and second axis and bending the mandrel.

15. The method of clause 14, wherein bending the mandrel comprises breaking the mandrel.

16. The method of any one of clauses 14-15, wherein the fastening collar installation apparatus further comprises a locker configured to be received by the slot, wherein the locker extends at least partially into the slot to inhibit the lever from moving into the second lever position during the forcibly contacting the first anvil end of the anvil with the fastening collar, and wherein the method further comprises:

removing the locker from the slot to enable the lever to move to the second lever position.

17. The method of any one of clauses 14-16, wherein the fastening collar installation apparatus further comprises:

a collet positioned within the sleeve cavity, the collet comprising jaws; and wherein the method further comprises engaging the jaws of the collet with a first end of the mandrel while the collet is in a first collet position, and subsequent to the engaging, moving the collet to a second collet position such that a distance between the anvil and the collet increases, thereby urging the fastening collar to contact the anvil.

18. The method of clause 17, wherein the first lever end of the lever of the fastening collar installation apparatus comprises a protrusion, and wherein the method further comprises:

subsequent to the bending, urging the lever into the first lever position by moving the collet towards the first collet position and forcibly contacting the collet with the protrusion.

19. The method of any one of clauses 17-18, wherein the fastening collar installation apparatus further comprises a locker configured to be received by the slot and comprising a first magnet, wherein the collet comprises a second magnet and a third magnet intermediate a collet end of the collet and the second magnet, wherein the second magnet of the collet is configured to attract the first magnet and the third magnet of the collet is configured to repel the first magnet, and wherein the method further comprises:

urging the locker into the slot with the second magnet prior to forcibly contacting the first anvil end of the anvil with the fastening collar;

moving the collet into the second collet position; and urging the locker out of the slot with the third magnet.

20. The method of clause 19, wherein the method further comprises:

forcibly contacting the locker with the second lever end of the lever during the forcibly contacting the first anvil end of the anvil with the fastening collar to inhibit the locker from being moved; and substantially removing the forcible contact between the locker and the second lever end of the lever; and removing the locker from the slot with the third magnet.

One skilled in the art will recognize that the herein described fasteners, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A fastening collar installation apparatus comprising:
    an anvil comprising
        a first anvil end; and
        a second anvil end,
        wherein an anvil cavity extends into the anvil along a first axis from the first anvil end, the anvil cavity configured to receive at least a portion of a mandrel;
    a sleeve comprising
        a first section comprising a first sleeve end and a second sleeve end, the first sleeve end is intermediate the anvil and the second sleeve end,
        wherein a sleeve cavity extends from the first sleeve end along a second axis, and a slot extends a first distance from the first sleeve end; and
    a lever slidably received by the slot of the sleeve and configured to move between a first lever position in the slot and a second lever position in the slot, the lever comprising
        a first lever end; and
        a second lever end, wherein the first lever end is intermediate the second lever end and the anvil,
        wherein a second distance is defined from the first lever end to the second lever end, and wherein the second distance is less than the first distance;
    wherein, in the first lever position of the lever, the first axis and the second axis are aligned; and
    wherein, in the second lever position of the lever, the first axis and the second axis are not aligned.

2. The fastening collar installation apparatus of claim 1, wherein in the second lever position of the lever, the first axis and the second axis are misaligned by at least 5 degrees.

3. The fastening collar installation apparatus of claim 1, wherein, in the second lever position of the lever, the first axis and the second axis are misaligned at an angle in a range of 5 degrees to 10 degrees.

4. The fastening collar installation apparatus of claim 1, further comprising:
    a locker configured to be received by the slot,
    wherein the locker is moveable between a first locker position and a second locker position,
    wherein, in the first locker position, the locker extends at least partially into the slot to inhibit the lever from moving into the second lever position, and
    wherein, in the second locker position, the locker does not extend into the slot and allows the lever to move into the second lever position.

5. The fastening collar installation apparatus of claim 4, further comprising:

a housing comprising:
  a first housing end; and
  a second housing end,
    wherein a housing cavity extends along a third axis from the first housing end to the second housing end,
    wherein the anvil, the sleeve, and the lever are positioned within the housing cavity,
    wherein the anvil is positioned intermediate the first housing end and the sleeve,
    wherein an opening extends along a fourth axis perpendicular to the third axis,
    wherein the opening is aligned with at least a portion of the slot, and
    wherein, in the second locker position, the locker is positioned within the opening.

6. The fastening collar installation apparatus of claim 1, further comprising:
  a collet positioned within the sleeve cavity, the collet comprising:
    a collet end adjacent to the anvil, the collet end comprising jaws to engage at least a portion of a mandrel,
    wherein the collet is moveable between a first collet position and a second collet position in the sleeve cavity.

7. The fastening collar installation apparatus of claim 6, wherein the first lever end of the lever comprises a protrusion, and wherein, in the first collet position, the collet urges the lever into the first lever position by contacting the protrusion.

8. The fastening collar installation apparatus of claim 6, further comprising:
  a locker configured to be received by the slot and comprising a first magnet,
  wherein the locker is moveable between a first locker position and a second locker position,
  wherein, in the first locker position, the locker inhibits the lever from moving into the second lever position,
  wherein, in the second locker position, the lever allows the lever to move into the second lever position,
  wherein the collet comprises a second magnet and a third magnet intermediate the second magnet and the collet end, and wherein
  the second magnet is configured to attract the first magnet and the third magnet is configured to repel the first magnet.

9. A fastener installation kit comprising:
  the fastening collar installation apparatus of claim 1; and
  a fastener system configured to be installed by the fastening collar installation apparatus.

10. The kit of claim 9, wherein in the second lever position of the lever the first axis and the second axis are misaligned by at least 5 degrees.

11. The kit of claim 9, wherein in the second lever position of the lever, the first axis and the second axis are misaligned by an angle in a range of 5 degrees to 10 degrees.

12. The kit of claim 9, wherein the first lever end of the lever comprises a protrusion, and wherein in the first collet position the collet urges the lever into the first lever position by contacting the protrusion.

13. The kit of claim 9, wherein the fastening collar installation apparatus a locker and a collet, wherein the locker comprises a first magnet and the collet comprises a second magnet and a third magnet intermediate the second magnet and the collet end, wherein the second magnet is configured to attract the first magnet and the third magnet is configured to repel the first magnet.

14. A method for installing a fastener system comprising a fastening collar and a mandrel, the method comprising:
  positioning a first anvil end of an anvil of a fastening collar installation apparatus in contact with the fastening collar, the fastening collar installation apparatus comprising:
    an anvil comprising:
      the first anvil end; and
      a second anvil end,
      wherein an anvil cavity extends into the anvil along a first axis from the first anvil end, the anvil cavity configured to receive at least a portion of the mandrel;
    a sleeve comprising
      a first section comprising a first sleeve end and a second sleeve end, the first sleeve end is intermediate the anvil and the second sleeve end,
      wherein a sleeve cavity extends from the first sleeve end along a second axis, and
      wherein a slot extends a first distance from the first sleeve end; and
    a lever slidably received by the slot of the sleeve and configured to move between a first lever position in the slot and a second lever position in the slot, the lever comprising
      a first lever end; and
      a second lever end, wherein the first lever end is intermediate the second lever end and the anvil,
      wherein a second distance is defined from the first lever end to the second lever end, and
      wherein the second distance is less than the first distance;
    wherein, in the first lever position of the lever, the first axis and the second axis are aligned, and
    wherein, in the second lever position of the lever, the first axis and second axis are not aligned;
  subsequent to the positioning, forcibly contacting the first anvil end of the anvil with the fastening collar while the lever is in the first lever position, thereby deforming the fastening collar onto the mandrel;
  moving the lever to the second lever position, thereby misaligning the first and second axis and bending the mandrel.

15. The method of claim 14, wherein bending the mandrel comprises breaking the mandrel.

16. The method of claim 14, wherein the fastening collar installation apparatus further comprises a locker configured to be received by the slot, wherein the locker extends at least partially into the slot to inhibit the lever from moving into the second lever position during the forcibly contacting the first anvil end of the anvil with the fastening collar, and wherein the method further comprises:
  removing the locker from the slot to enable the lever to move to the second lever position.

17. The method of claim 14, wherein the fastening collar installation apparatus further comprises:
  a collet positioned within the sleeve cavity, the collet comprising jaws; and
  wherein the method further comprises
    engaging the jaws of the collet with a first end of the mandrel while the collet is in a first collet position, and
    subsequent to the engaging, moving the collet to a second collet position such that a distance between the anvil and the collet increases, thereby urging the fastening collar to contact the anvil.

18. The method of claim 17, wherein the first lever end of the lever of the fastening collar installation apparatus comprises a protrusion, and wherein the method further comprises:
  subsequent to the bending, urging the lever into the first lever position by moving the collet towards the first collet position and forcibly contacting the collet with the protrusion.

19. The method of claim 17, wherein the fastening collar installation apparatus further comprises a locker configured to be received by the slot and comprising a first magnet, wherein the collet comprises a second magnet and a third magnet intermediate a collet end of the collet and the second magnet, wherein the second magnet of the collet is configured to attract the first magnet and the third magnet of the collet is configured to repel the first magnet, and wherein the method further comprises:
  urging the locker into the slot with the second magnet prior to forcibly contacting the first anvil end of the anvil with the fastening collar;
  moving the collet into the second collet position; and
  urging the locker out of the slot with the third magnet.

20. The method of claim 19, wherein the method further comprises:
  forcibly contacting the locker with the second lever end of the lever during the forcibly contacting the first anvil end of the anvil with the fastening collar to inhibit the locker from being moved; and
  removing the forcible contact between the locker and the second lever end of the lever; and
  removing the locker from the slot with the third magnet.

* * * * *